(12) United States Patent
Skaff et al.

(10) Patent No.: US 9,506,781 B2
(45) Date of Patent: Nov. 29, 2016

(54) VEHICLE INFORMATION DISPLAY AND METHOD

(75) Inventors: Ryan J. Skaff, Farmington Hills, MI (US); Derek Hartl, Royal Oak, MI (US); Paul Stephen Bryan, Belleville, MI (US); Angela L. Watson, Ann Arbor, MI (US); David L. Watson, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 2095 days.

(21) Appl. No.: 12/604,046

(22) Filed: Oct. 22, 2009

(65) Prior Publication Data

US 2011/0095878 A1    Apr. 28, 2011

(51) Int. Cl.

| B60Q 1/00 | (2006.01) |
|---|---|
| G09F 9/00 | (2006.01) |
| G01D 11/28 | (2006.01) |
| B60K 6/445 | (2007.10) |
| B60K 35/00 | (2006.01) |
| B60W 50/14 | (2012.01) |
| G01D 7/00 | (2006.01) |

(Continued)

(52) U.S. Cl.
CPC ............. *G01D 11/28* (2013.01); *B60K 6/445* (2013.01); *B60K 35/00* (2013.01); *B60W 50/14* (2013.01); *G01D 7/005* (2013.01); *G01D 7/04* (2013.01); *G07C 5/06* (2013.01); *B60K 2350/1092* (2013.01); *Y02T 10/6239* (2013.01)

(58) Field of Classification Search
CPC  B60K 2350/1092; B60K 31/18; B60Q 1/44; B60Q 1/00; Y02T 10/6239; Y02T 10/70; Y02T 10/7077; Y02T 10/6286; Y02T 10/642; Y02T 10/645; Y02T 10/72; Y02T 10/7275; Y02T 10/76; B60L 11/14; B60L 2250/16; B60L 2270/42; B60L 15/20; B60L 2240/421; B60L 2240/423; B60L 2240/441; B60L 2240/486; B60L 2250/10; B60L 2270/145; B60W 10/08; B60W 2050/143; B60W 20/00; B60W 50/14; B60W 10/06; B60W 10/18; B60W 2050/146; B60W 20/20; B60W 20/40; B60W 2510/0638; B60W 2510/081; B60W 2510/1005; B60W 2510/244; B60W 2520/10; B60W 2540/06; B60W 2540/10; B60W 2540/12; B60W 2710/083; B60W 2710/105; B60W 30/18045; B60W 30/18118; B60W 40/105; B60W 50/16
USPC ................................ 340/441, 438, 439, 461
See application file for complete search history.

(56) References Cited

U.S. PATENT DOCUMENTS

| 4,890,088 A * | 12/1989 | Woodell ...................... 340/459 |
|---|---|---|
| 5,487,002 A | 1/1996 | Diller et al. |
| 5,623,194 A | 4/1997 | Boll et al. |

(Continued)

OTHER PUBLICATIONS

Non-final Office Action dated Jun. 27, 2011 for U.S. Appl. No. 12/425,620, filed Apr. 17, 2009 (FMC 2662 PUS), pp. 1-10.

*Primary Examiner* — Amine Benlagsir
*Assistant Examiner* — Emily C Terrell
(74) *Attorney, Agent, or Firm* — Brooks Kushman P.C.; Jennifer Stec (57) ABSTRACT

An information display system for a hybrid electric vehicle configured to display one or more reasons an engine is on is provided. The information display system also indicates how close the engine is to turning on due to an engine on reason by displaying a proximity indicator representing a value associated with the engine on reason and a threshold demarcating values which cause the engine to be on.

8 Claims, 8 Drawing Sheets

(51) Int. Cl.
*G01D 7/04* (2006.01)
*G07C 5/06* (2006.01)

(56) References Cited

U.S. PATENT DOCUMENTS

| | | | |
|---|---|---|---|
| 5,841,201 A * | 11/1998 | Tabata et al. | 290/40 C |
| 6,078,853 A | 6/2000 | Ebner et al. | |
| 6,600,413 B1 * | 7/2003 | Lo | 340/439 |
| 7,013,205 B1 | 3/2006 | Hafner et al. | |
| 7,091,839 B2 * | 8/2006 | Situ et al. | 340/438 |
| 7,157,806 B2 * | 1/2007 | Jabaji et al. | 307/9.1 |
| 7,609,152 B2 | 10/2009 | Crowe et al. | |
| 7,796,019 B2 | 9/2010 | Yamada | |
| 8,207,838 B2 * | 6/2012 | Watanabe et al. | 340/439 |
| 8,417,435 B2 * | 4/2013 | Yamaguchi | 701/102 |
| 2006/0185917 A1 | 8/2006 | Ozeki et al. | |
| 2009/0125173 A1 * | 5/2009 | Komatsu et al. | 701/22 |
| 2009/0174539 A1 * | 7/2009 | Benyola | 340/439 |
| 2011/0202210 A1 * | 8/2011 | Goda | 701/22 |

* cited by examiner

| RANK | ENGINE ON REASON | EXPLANATION |
|---|---|---|
| 1 | NEUTRAL GEAR | Engine is on because vehicle is in neutral gear. Shift out of neutral gear to return to electric mode. |
| 2 | LOW GEAR | Engine is on because vehicle is in LOW gear. Shift out of low gear to return to electric mode. |
| 3 | HIGH SPEED | Engine is on because vehicle speed exceeds the level for electric mode operation. Reduce speed to return to electric mode. |
| 4 | HEATER SETTING | Engine is on because of heater setting. Reduce or shut off heater setting to return to electric mode. |
| 5 | ENGINE COLD | Engine is on to warm-up. Vehicle will return to electric mode when engine is warm. |
| 6 | BATTERY CHARGING | Engine is on to charge the hybrid battery. Vehicle will return to electric mode once battery is charged. |
| 7 | ACCELERATION | Engine is on because of pressure applied to accelerator pedal. Reduce pressure to the accelerator pedal to return to electric mode. |
| 8 | NORMAL OPERATION | Engine is on to optimize vehicle operation. Vehicle will return to electric mode when possible. |

VEHICLE INFORMATION DISPLAY AND METHOD

TECHNICAL FIELD

The following relates to an information display system and method for displaying information relating to the operation of a hybrid electric vehicle (HEV) and, more particularly, to a system and method for conveying to an operator how close the HEV is from entering or exiting an electric vehicle (EV) mode.

A detailed description and accompanying drawings are set forth below.

DETAILED DESCRIPTION

With reference to FIGS. 1-8, a more detailed description of embodiments of the system and method and various components thereof will now be provided.

All vehicles, whether passenger or commercial, include a number of gauges, indicators, and various other displays to provide the vehicle operator with information regarding the vehicle and its surroundings. With the advent of new technologies, such as hybrid electric vehicles (HEVs), has come a variety of new gauges and information displays that help drivers to better learn the operation of these vehicles that utilize new technology. For example, many HEVs incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as a battery.

With regard to HEVs, it is known that some drivers may not be able to achieve desired fuel economy numbers, in part because of driving habits. In many cases, drivers are willing to modify their behavior, but are unable to translate recommended techniques into real changes in their driving habits. Moreover, gauges or displays that merely indicate when the engine is on or off, provide information that is not timely (i.e., once the indicator signals that the engine is on, it is too late for the driver to modify his or her driving to keep the engine off). Further, these gauges or displays fail to indicate why the engine is on in the first place.

With the advent of sensing electronics, computers and other vehicle related technology, the amount of vehicle information that can be communicated to the driver is virtually limitless. Often, the driver may not even know of all the features and capabilities their vehicles have to offer. Displaying certain types of information, particularly information relevant to HEVs, can help facilitate economical driving choices by a driver.

One or more embodiments of the present application relate to displaying content particularly designed to influence driving habits. Specifically, one or more embodiments are directed to an information display for a vehicle, and a method for displaying such information, that provides content that will help a driver increase fuel economy and other energy efficiencies. The information display can convey information regarding the operation of an HEV, such as the specific reasons that cause the engine to come on, how close the engine is to turning on, and what a driver can do to enable the engine to turn off.

Figure 1:
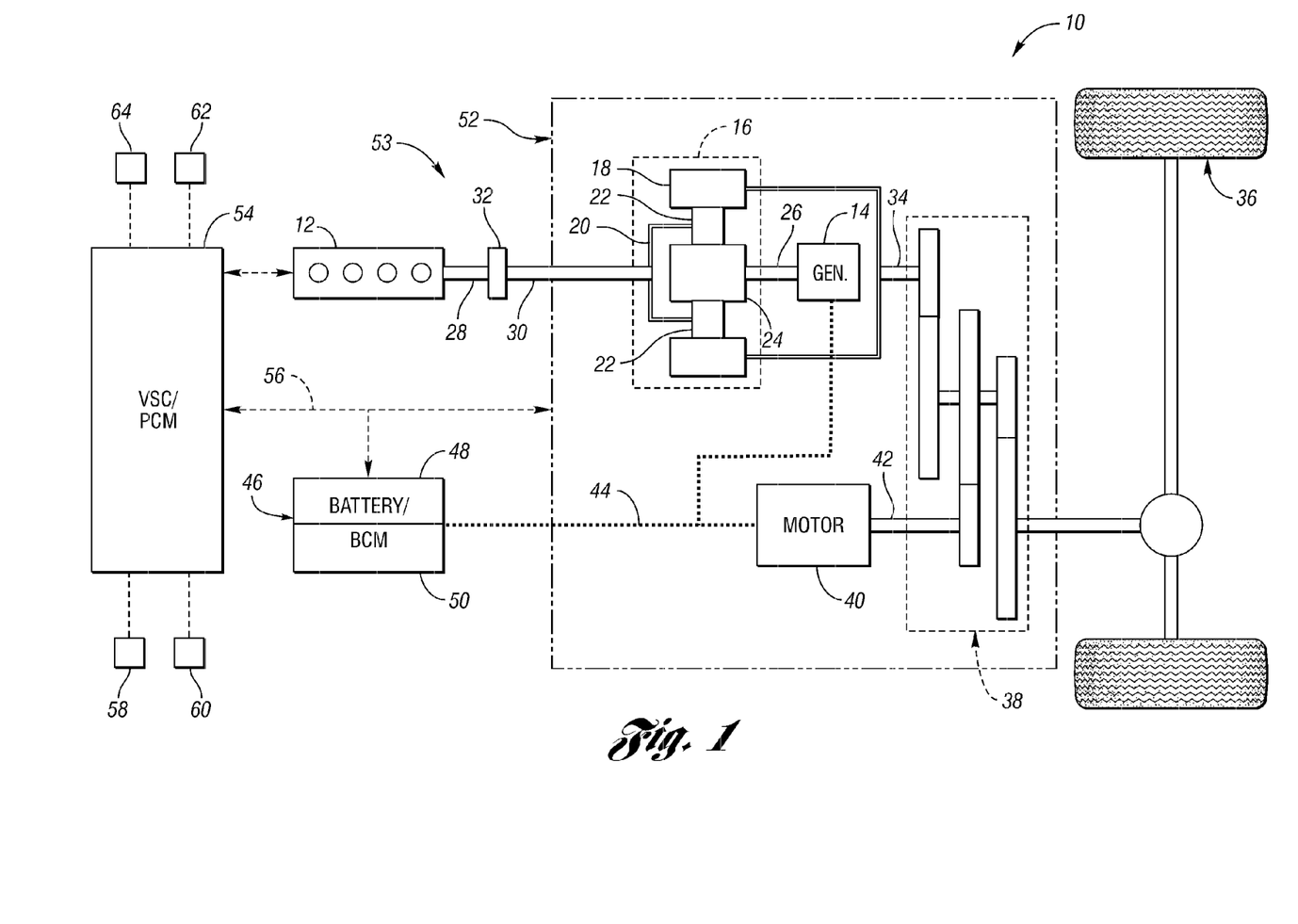
FIG. 1 is a simplified, exemplary schematic representation of a hybrid electric vehicle (HEV) including an information display system according to one or more embodiments of the present application.

Referring now to the drawings, FIG. 1 is a simplified, exemplary schematic representation of a vehicle 10, which includes an engine 12 and an electric machine, or generator 14. The engine 12 and the generator 14 are connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 outputs torque to a crankshaft 28, which is connected to a shaft 30 through a passive clutch 32. The clutch 32 provides protection against over-torque conditions. The shaft 30 is connected to the carrier 20 of the planetary gear arrangement 16, and the ring gear 18 is connected to a shaft 34, which is connected to a first set of vehicle drive wheels, or primary drive wheels 36, through a gear set 38.

The vehicle 10 includes a second electric machine, or motor 40, which can be used to output torque to a shaft 42 connected to the gear set 38. Other vehicles within the scope of the present application may have different electric machine arrangements, such as more or fewer than two electric machines. In the embodiment shown in FIG. 1, the electric machine arrangement (i.e., the motor 40 and the generator 14) can both be used as motors to output torque. Alternatively, each can also be used as a generator, outputting electrical power to a high voltage bus 44 and to an energy storage system 46, which includes a battery 48 and a battery control module (BCM) 50.

The battery 48 is a high voltage battery that is capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle control system, shown generally as controller 54, may be provided. Although it is shown as a single controller, it may include multiple controllers which may be used to control multiple vehicle systems. For example, the controller 54 may be a vehicle system controller/powertrain control module (VSC/PCM). In this regard, the PCM portion of the VSC/PCM may be software embedded within the VSC/PCM, or it can be a separate hardware device.

A controller area network (CAN) 56 allows the controller 54 to communicate with the transmission 52 and the BCM 50. Just as the battery 48 includes a BCM 50, other devices controlled by the controller 54 may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present application. Although illustrated and described in the context of the vehicle 10, which is a full HEV, it is understood that embodiments of the present application may be implemented on other types of vehicles, such as those including other hybrid systems.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. The braking system 58 may also include a regenerative braking system, wherein braking energy is captured and stored as electrical energy in the battery 48. Similarly, the accelerator pedal 60 may include one or more sensors, which, like the sensors in the braking system 58, communicate with the controller 54.

The air conditioning system 62 also communicates with the controller 54. The on/off status of the air conditioning system can be communicated to the controller 54, and can be based on, for example, the status of an operator actuated switch, or the automatic control of the air conditioning system 62 based on related functions such as window defrost. In addition to the foregoing, the vehicle 10 may include an information display system 64, which, as explained in detail below, provides vehicle content to an operator of the vehicle 10.

Figure 2A:
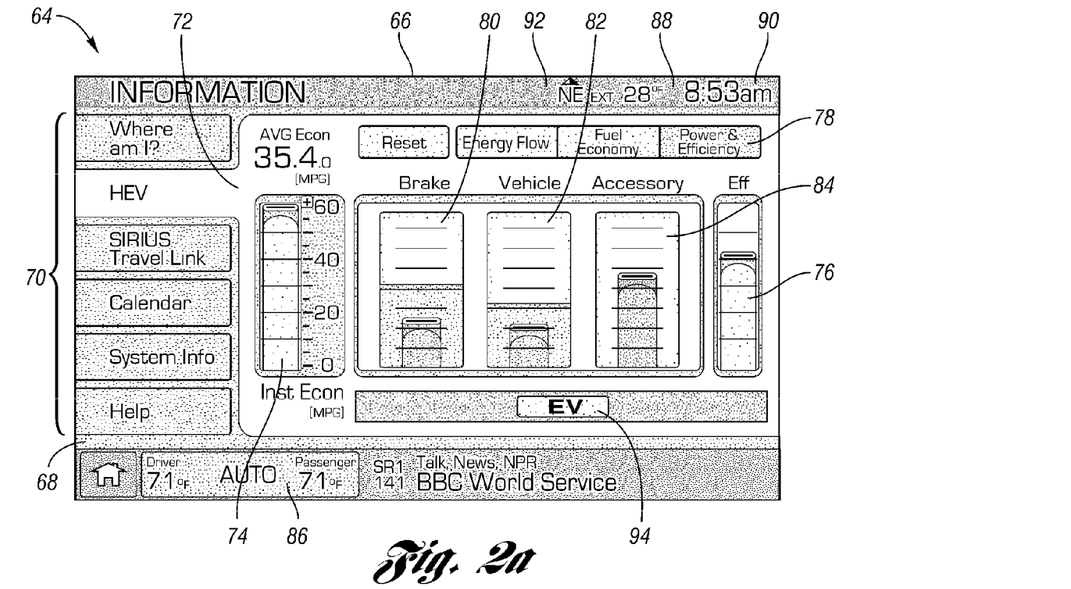
FIG. 2a is simplified, exemplary diagram depicting the information display system when an HEV is in an electric vehicle (EV) mode according to one or more embodiments of the present application.

Referring now to FIG. 2a, the information display system 64 according to one or more embodiments of the present application is shown in greater detail. The information display system may include its own control module (not shown) in communication with the controller 54 or may directly interface with the controller 54 for purposes of employing the various aspects of the present application. The information display system 64 may include an information display 66. The information display 66 may be disposed within a dashboard (not shown) of the vehicle 10, such as in an instrument panel or center console area. The information display 66 may be part of another display system, such as a navigation display system, or may be part of a dedicated information display system. The information display 66 may be a liquid crystal display (LCD), a plasma display, an organic light emitting display (OLED), or any other suitable display. The information display 66 may include a touch screen 68 for receiving driver input associated with selected areas of the information display 66. The information display system 64 may also include one or more buttons (not shown), including hard keys or soft keys, located outside of the information display 66 for effectuating driver input. Other operator inputs known to one of ordinary skill in the art may also be employed without departing from the scope of the present application.

As shown in FIG. 2a, the information display 66 may be configured to display one or more selectable display pages 70, such as a navigation page, an HEV page, a stereo page, or the like. A selected display page may be referred to as an active page 72. As shown in FIG. 2a, the HEV page may be the active page. The HEV page may display content relating to the operation of a hybrid electric vehicle, such as vehicle 10. As seen therein, the information display 66 may include one or more vehicle gauges. For example, the information display 66 may include an instantaneous fuel economy gauge 74 and an overall energy efficiency gauge 76. Moreover, the information display 66 may include driver-selectable gauges or sets of gauges 78, such as gauges relating to "Power & Efficiency" of the HEV. In this regard, the information display 66 may include a brake demand gauge 80, a vehicle demand gauge 82 and an accessory load gauge 84. The information display 66 may also provide additional content, such as climate control information 86, ambient temperature 88, time 90, and a compass 92.

As shown in FIG. 2a, the information display system 64 may include an electric vehicle (EV) mode indicator 94. The EV mode indicator 94 may be a display icon, indicator light, or the like. Moreover, the EV mode indicator 94 may be displayed (or activated) via the information display 66 when the engine 12 of the vehicle 10 is off. Accordingly, the EV mode indicator 94 can convey the state of the HEV to the operator. If the EV mode indicator 94 is displayed, or is otherwise active, the operator may understand that the engine 12 is off and that the vehicle 10 is in the EV mode. If the EV mode indicator 94 is not displayed, or is otherwise inactive, the operator may understand that the engine 12 is on.

Figure 2B:
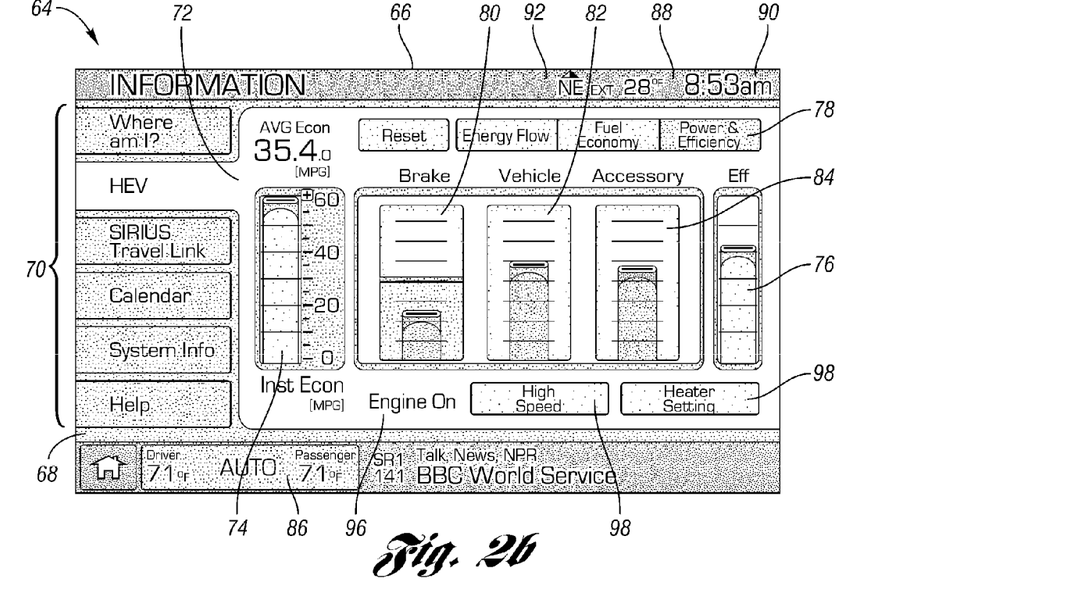
FIG. 2b is a simplified, exemplary diagram depicting the information display system when the HEV is not in the EV mode according to one or more embodiments of the present application.

Referring now to FIG. 2b, wherein like reference numerals represent like elements, an exemplary embodiment of the information display system 64, including the information display 66, when the engine 12 of vehicle 10 is on is shown. As seen therein, rather than displaying the EV mode indicator 94, the information display 66 may include an engine on indicator 96. In addition to the engine on indicator 96, the information display 66 may also include iconography corresponding to one or more of a plurality of engine on reasons 98. As shown in FIG. 2b, two engine on reasons may be displayed (e.g., "High Speed" and "Heater Setting"). However, greater than or fewer than two engine on reasons may be displayed without departing from the scope of the present application.

HEV operation and control strategy can be extremely complex and may include as many as 30, 40 or even more vehicle system events, states or other items that cause an engine to either start, stop, remain on, or remain off. Items that trigger the engine 12 to start may be referred to as engine pull-up requests. Items that trigger the engine 12 to stop may be referred to as engine pull-down requests. Items that cause the engine 12 to remain on, if already on, may be referred to as inhibit pull-down requests. Finally, items that cause the engine 12 to remain off, if already off, may be referred to as inhibit pull-up requests. According to one or more embodiments of the present application, a strategy may be employed to filter the 30 or more items and categorize, or otherwise group, them into a reasonable number that can be both easily understood and readily discernable by a typical operator of the vehicle 10.

According to the strategy, the entire set of items that affect engine operation may be filtered by eliminating the engine pull-down and inhibit pull-up requests. Thus, items that cause the engine to stop or items that prevent the engine from turning on may be ignored. The remaining engine pull-up and inhibit pull-down requests, referred to collectively as "engine on causes," may then be categorized into more general groups. Each group may be associated with one of the plurality of engine on reasons 98. Accordingly, each engine on reason 98 may therefore be associated with one or more engine on causes. For example, an engine on cause related to reverse vehicle speed and an engine on cause related to forward vehicle speed may both be engine on causes associated with a "High Speed" engine on reason. The title of each engine on reason (e.g., "High Speed" and "Heater Setting") may be selected so that the operator can easily understand why the vehicle's engine is on instead of conveying complex engineering terms that some operators may have difficulty comprehending.

Several engine on reasons 98 may be present or "true" at any given moment when the engine 12 of the vehicle 10 is on. However, according to an embodiment of the present application, it may be desirable to limit the number of engine on reasons displayed by the information display 66 for the sake of simplicity, due to space constraints, or the like. Accordingly, a prioritization strategy may be applied to the plurality of engine on reasons 98. The prioritization strategy may determine which of the plurality of engine on reasons 98 are displayed. Moreover, if more than one engine on reason 98 can be displayed, the prioritization strategy may determine the order in which each engine on reason 98 is displayed, if more than one engine on reason 98 is true.

Figure 3:
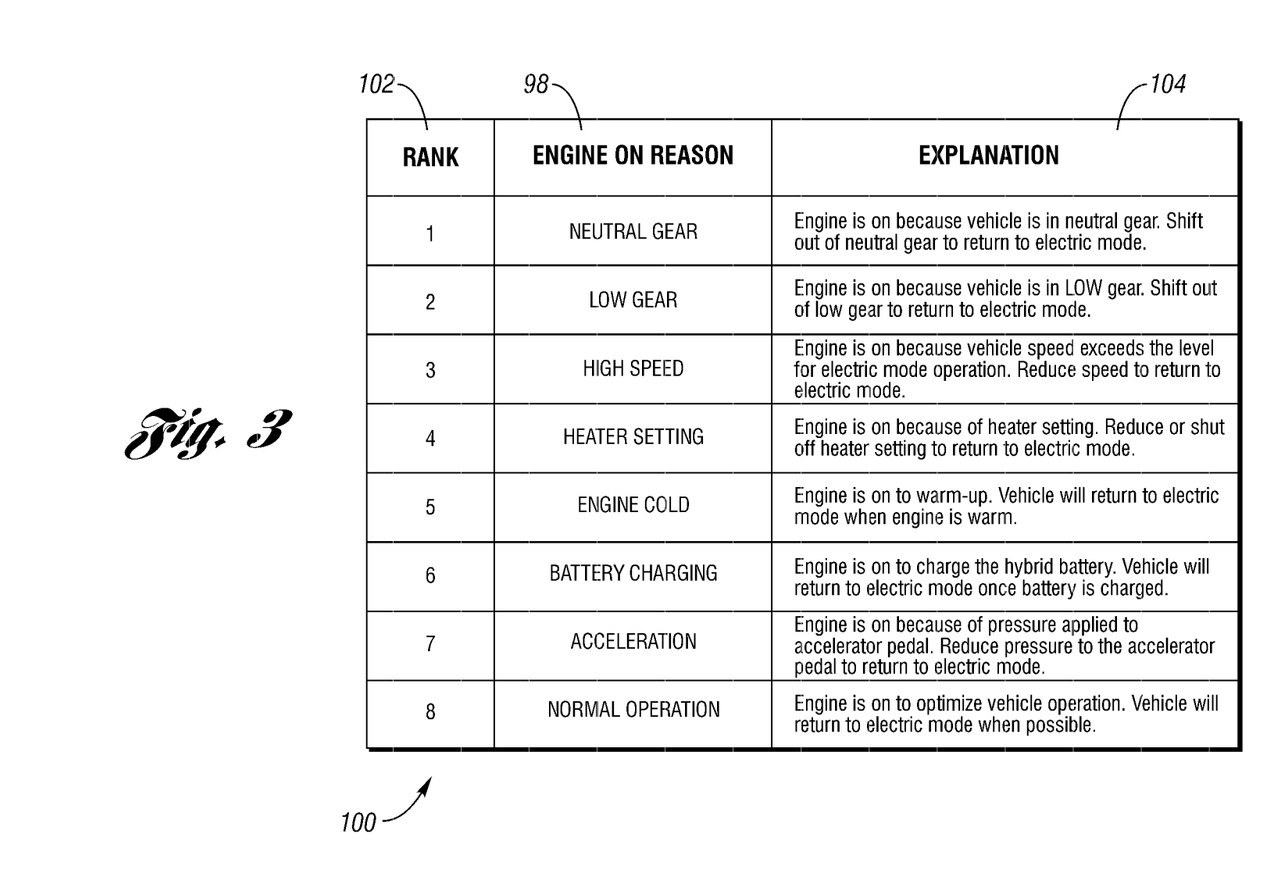
FIG. 3 is a simplified, exemplary table showing several engine on reasons and their associated explanation according to a display ranking in accordance with an embodiment of the present application.

FIG. 3 shows an exemplary table 100 of the plurality of engine on reasons 98. A display ranking 102 may be given to each engine on reason 98 based upon the prioritization strategy. An engine on reason listed in the table 100 may be displayed before another engine on reason that is listed below it, assuming both reasons are true at a given moment. For example, if at a given moment, the engine 12 is on and more than one engine on reason is true, then the engine on reason with the highest display ranking 102 (lowest number in FIG. 3) will be displayed first. If only one engine on reason is to be displayed on the information display 66, then the highest ranking engine on reason is displayed. If the information display system 64 is configured to display two engine on reasons, for example, then the top two engine on reasons according to their display ranking 102 may be displayed. The order in which the top two engine on reasons are displayed on the information display 66 may also be affected by the display ranking 102. Since a higher priority engine on reason, according to the display ranking, may become true when a lower priority engine on reason is already displayed, the lower priority reason shall shift or be removed from the information display 66 in order to show the higher priority reason first. The same logic can be applied for information display systems configured to display more than two engine on reasons.

The information display 66 in FIG. 2b can provide an example of how the prioritization strategy may be implemented. For example, at a given moment in time, the engine 12 may be on and three engine on reasons 98 may be true. For instance, the engine 12 may be on due to "High Speed," "Heater Setting," and "Battery Charging" engine on reasons being true. As shown in FIG. 2b, the information display system 64 may be configured to display only two engine on reasons at a time. Accordingly, the "High Speed" and "Heater Setting" engine on reasons may be displayed by the information display 66 since they are listed above the "Battery Charging" engine on reason in the table 100 of FIG. 3. Moreover, the "High Speed" engine on reason may be shown to the left of the "Heater Setting" engine on reason on the information display 66 since it has a higher display ranking. If a higher priority engine on reason such as "Neutral Gear" becomes true while the others remain true, then the "High Speed" engine on reason may be shifted to the right replacing the "Heater Setting" engine on reason. The "Neutral Gear" engine on reason may be displayed where the "High Speed" engine on reason previously existed. The "Heater Setting" engine on reason may be removed from the display altogether.

Since the reasons that cause the engine 12 to be on may constantly change, the information display system 64 of the present application may continuously monitor other vehicle systems and conditions and update the information display 66 accordingly. Should the engine 12 of vehicle 10 turn off, the information display 66 may update by displaying the EV mode indicator 94.

The table 100 of FIG. 3 also provides a column containing a brief explanation 104 associated with each engine on reason 98. According to one or more embodiments of the present application, the explanation 104 associated with a specified engine on reason 98 may also be displayed as text by the information display 66. For example, at a given moment when a particular engine on reason is being displayed, an operator may select an input device that corresponds to the particular engine on reason. The input device may be a region of the touch screen 68 where the engine on reason is displayed. Alternatively, the input device may be a button provided adjacent the information display 66. If an operator selects a particular engine on reason 98, the associated explanation 104 for the engine on reason may appear on the information display 66.

It should be noted that the engine on reasons 98 shown in the table 100 of FIG. 3 are merely exemplary. In this regard, more or less engine on reasons 98 may be provided without departing from the scope of the present application. Moreover, the specific engine on reasons may differ as well as their corresponding labels and explanations. Finally, as previously discussed, the display ranking 102 assigned to each engine on reason 98 may be altered depending upon the specific prioritization strategy employed.

In addition to conveying the reasons that caused the engine to turn on (and what may prompt the engine to shut off), the display 66 may also indicate how close the engine 12 is to turning on and what may be done to prevent it. Similarly, if the engine 12 is already on, the display 66 may also indicate how close the engine 12 is to shutting down. In this regard, the information display 66 can provide timely information about vehicle operating conditions to an operator so that driving behavior may be modified prior to engine activation.

Figure 4A:
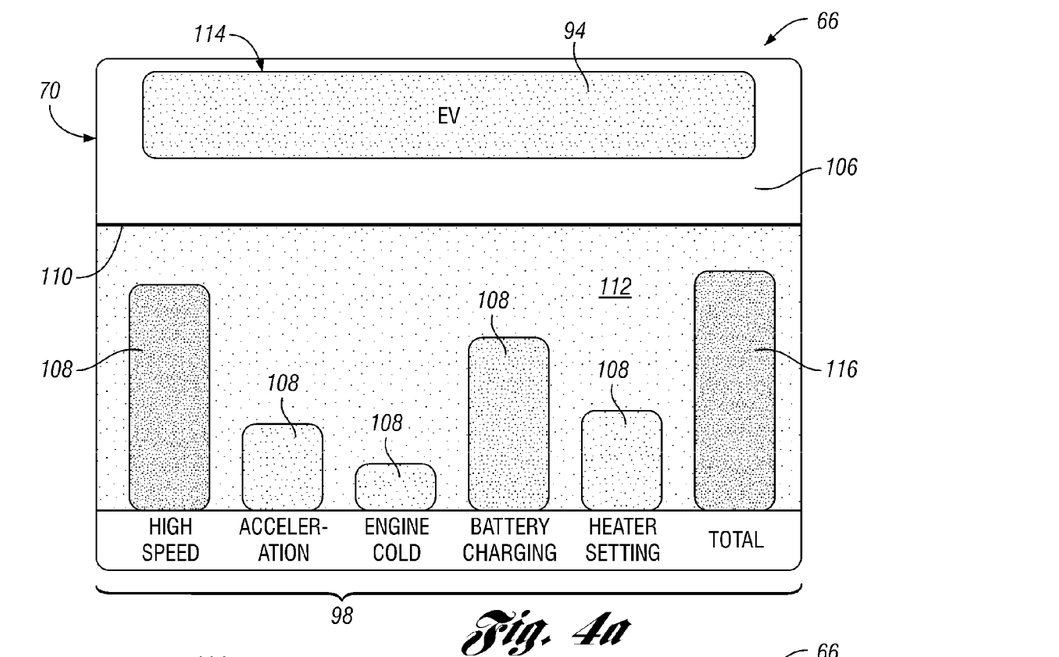
FIG. 4a is a simplified, exemplary diagram depicting a proximity gauge according to one or more embodiments of the present application.
Figure 4B:
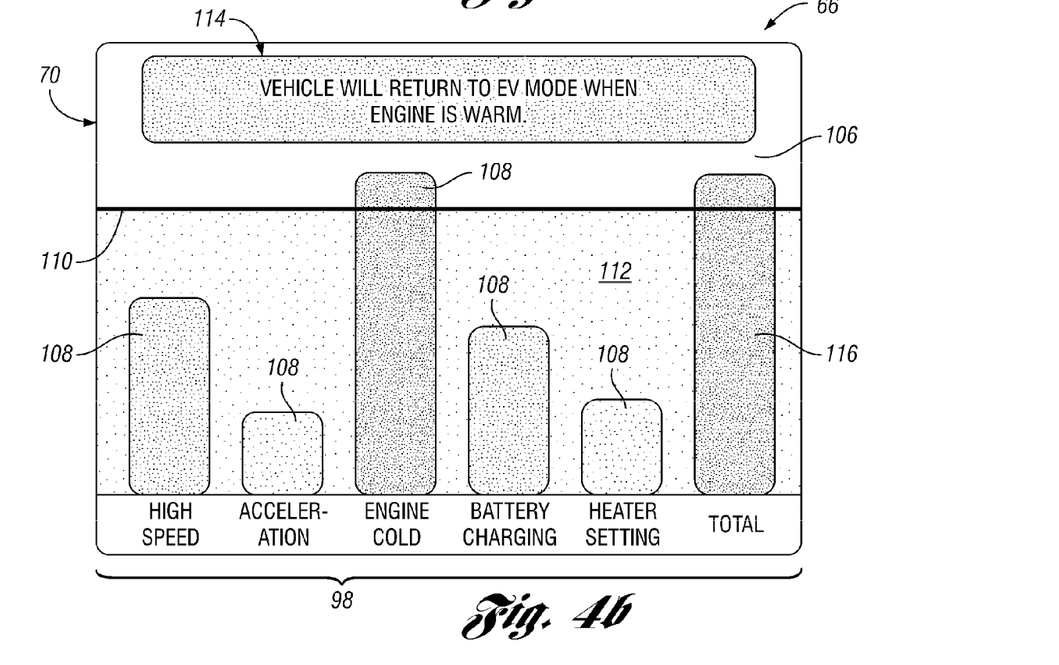
FIG. 4b is a simplified, exemplary diagram depicting a proximity gauge according to one or more embodiments of the present application.

FIGS. 4a and 4b depict simplified, exemplary diagrams of the information display 66 showing the relative proximity of a transition from the EV mode to the engine on mode (or engine on more to EV mode). In particular, the information display 66 may include an engine on proximity gauge 106, which can be displayed on one or more of the selectable display pages 70. The proximity gauge 106 may include one or more proximity indicators 108 corresponding to the engine on reasons 98. As shown, the proximity indicators 108 may be depicted as bars. However, other indicators may be used without departing from the scope of the present application.

A value corresponding to an engine on reason 98 may be associated with each proximity indicator 108. The proximity indicator 108 may change its appearance (e.g., size, shape, position, etc.) in connection with the value. The value may be based upon one or more vehicle operating characteristics or parameters. For instance, a value associated with the "High Speed" engine on reason may be the vehicle's current speed. As vehicle speed increases, its corresponding bar segment may likewise increase. The value may be updated continuously (e.g., in real time) or at discrete time intervals.

The proximity gauge 106 may also include an engine on/off threshold 110. The threshold 110 demarcates the transition point from the EV mode to the engine on mode. When a proximity indicator 108 reaches the threshold 110, the engine may turn on. As used herein, the term reaches may refer to when a proximity indicator meets or exceeds a threshold. For descriptive purposes, the region below the threshold may be referred to as the threshold region 112. The proximity gauge 106 may further include a status region 114. Information pertaining to the engine state or engine on reasons 98, for example, may be displayed in the status region 114.

The proximity gauge 106 depicted in FIGS. 4a and 4b displays the relative proximity to an engine mode transition for several of the engine on reasons 98. The proximity gauge 106 may display fewer or greater engine on reasons 98 than shown. Optionally, the proximity gauge 106 may also include a total proximity indicator 116. An operator may quickly identify how near the vehicle 10 is to an engine mode transition by looking to the total indicator 116. The operator may then look to the dedicated indicators 108, each corresponding to a specific engine on reason 98, for more detailed analysis of the vehicle's current operating state. The total indicator 116 may denote the cumulative impact each individual engine on reason value has on the engine state. Alternatively, the total indicator 116 may simply correspond to the engine on reason value nearest the threshold 110 when the vehicle 10 is in the EV mode or farthest from the threshold 110 when the engine 12 is presently operating.

According to one or more embodiments of the present application, the region below the threshold 110, the threshold region 112, may include values that do not trigger an engine pull-up request. In FIG. 4a, each proximity indicator 108 is shown below the threshold 110. Since none of the values associated with the engine on reasons 98 meet or exceed the threshold 110, the vehicle 10 may operate in the EV mode as designated by the presence of the EV mode indicator 94 in the status region 114. In FIG. 4b, the proximity indicator 108 associated with the "Engine Cold" engine on reason is shown extended beyond the threshold 110 indicating that the engine 12 may be on due to low engine temperature. Accordingly, the corresponding explanation 104 as provided in FIG. 3 may be displayed in the status region 114.

Other information in addition to or in place of the engine on reason explanation 104 may also be displayed in the status region 114 when the engine 12 is on. For example, the status region 114 may simply state the engine on reason 98, which is "Engine Cold" in this example. Should an operator desire additional information, the engine on reason explanation 104 may appear in a pop-up text block over the proximity gauge 106 where it may remain indefinitely or for a predetermined period of time. Alternately, an operator may be allowed to toggle between displaying the engine on reason 98 and the engine on reason explanation 104 in the status region 114 when the engine 12 is on.

The value associated with the "Engine Cold" engine on reason may correspond to engine coolant temperature, cylinder heat temperature, catalyst temperature, engine compartment temperature, or some other suitable value that can be measured to determine whether the engine 12 is too cold for EV mode operation. It should be noted that some of the proximity indicator values may be inverted such that the bar increases as the corresponding value decreases. For example, since the engine 12 may turn on due to a low engine temperature, the corresponding bar may increase as the engine temperature decreases. As another example, the value associated with the "Battery Charging" engine on reason may be percent state of charge (SOC). A low battery SOC may cause the engine 12 to turn on to keep the battery 48 from depleting or to help the battery 48 regain charge. Thus, as shown in FIGS. 4a and 4b, the bar indicator 108 corresponding to the "Battery Charging" engine on reason may increase as the battery SOC decreases. The threshold for the "Battery Charging" indicator may correspond to a minimum SOC value allowed before the engine 12 is turned on to help restore energy to the battery 48.

As shown in FIG. 4b, the total indicator 116 may also appear beyond the threshold 110 in response to the engine 12 being on due to a cold engine state. As previously described, the total indicator 116 may be displayed in this way in response to one or more of the engine on reasons 98 being true. Alternatively, the total indicator 116 may appear beyond the threshold 110 as a result of a combination of engine on reason values, which singularly may be insufficient to cause the engine 12 to turn on, but cumulatively may prompt the vehicle 10 to exit the EV mode.

The threshold 110 may be at the same level all the way across the proximity gauge, as depicted in FIGS. 4a and 4b. In most cases, since each engine on reason value has a different threshold in a different unit, the values associated with each corresponding proximity indicator 108 may be normalized to demonstrate relative proximity to an engine mode transition. For example, one parameter being monitored by the controller 54 to determine whether to command engine operation is vehicle speed. Thus, the value associated with the "High Speed" engine on reason may be in miles per hour (mph). However, the proximity indicator 108 may not convey actual vehicle speed. Rather, the proximity indicator 108 may indicate the current vehicle speed as a percentage of the speed threshold (or the difference between the speed threshold and the lower limit of the corresponding proximity indicator). For instance, if the speed threshold (forced engine pull-up speed) is 47 mph, the lower limit is 0 mph, and the current vehicle speed is 40 mph, the proximity indicator 108 may be displayed at approximately 85% of the way to the threshold [40/(47−0)].

In addition to the length of the bar segments, the color of a proximity indicator may indicate the proximity of its associated value to the engine on/off threshold 110. The indicator's color may change based upon this relative proximity. For instance, the proximity indicator 108 may have a green hue when it is relatively far from the threshold 110. As the proximity indicator 108 approaches the threshold 110, its color may transition from green to another hue, such as red, for example. The transition may be a continuous and gradual change.

Alternatively, a change in color of the proximity indicator 108 may occur in stages upon reaching one or more discrete, intermediate thresholds (not shown). To this end, the value obtained for each engine on reason parameter may be compared or converted to one or more engine on reason levels, each level covering a range of values. The proximity indicator 108 may move on the display 66 in increments in accordance with the one or more levels. The next proximity level may be attained when the value crosses an intermediate threshold. In this regard, the color properties of the proximity indicator 108 may change in correspondence with the current engine on reason level.

Additionally or alternatively, a background color may be employed to assist the operator in viewing the content displayed in the threshold region 112 or the status region 114. The background color may be a backlight to the information display 66 or may be a color produced directly by the display itself. The background color may vary based upon the relative proximity of the total indicator 116 to the engine on/off threshold 110. Alternately, the background color may illuminate at varying intensities based upon the relative proximity of the total indicator 116 to the engine on/off threshold 110. In this regard, the threshold region 112 or the status region 114 may appear to glow differently as the total indicator 116 approaches the threshold 110.

Figure 5A:
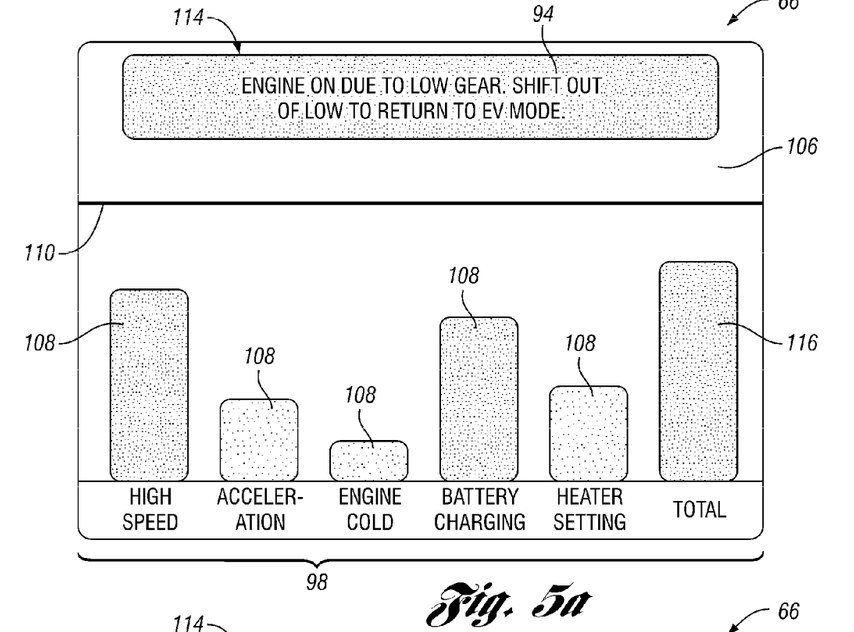
FIG. 5a is a simplified, exemplary diagram depicting a proximity gauge according to one or more embodiments of the present application.
Figure 5B:
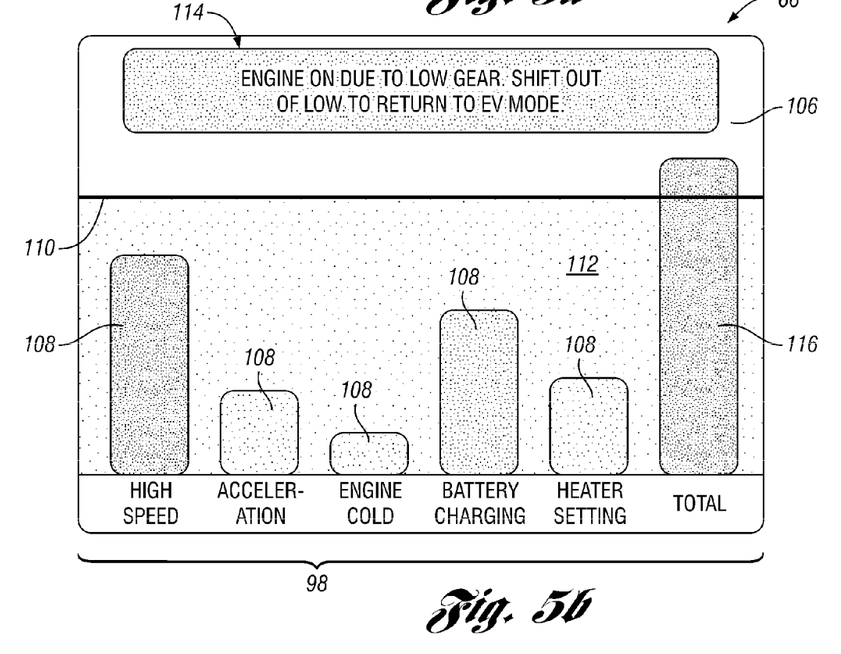
FIG. 5b is a simplified, exemplary diagram depicting a proximity gauge according to one or more embodiments of the present application.
Figure 5C:
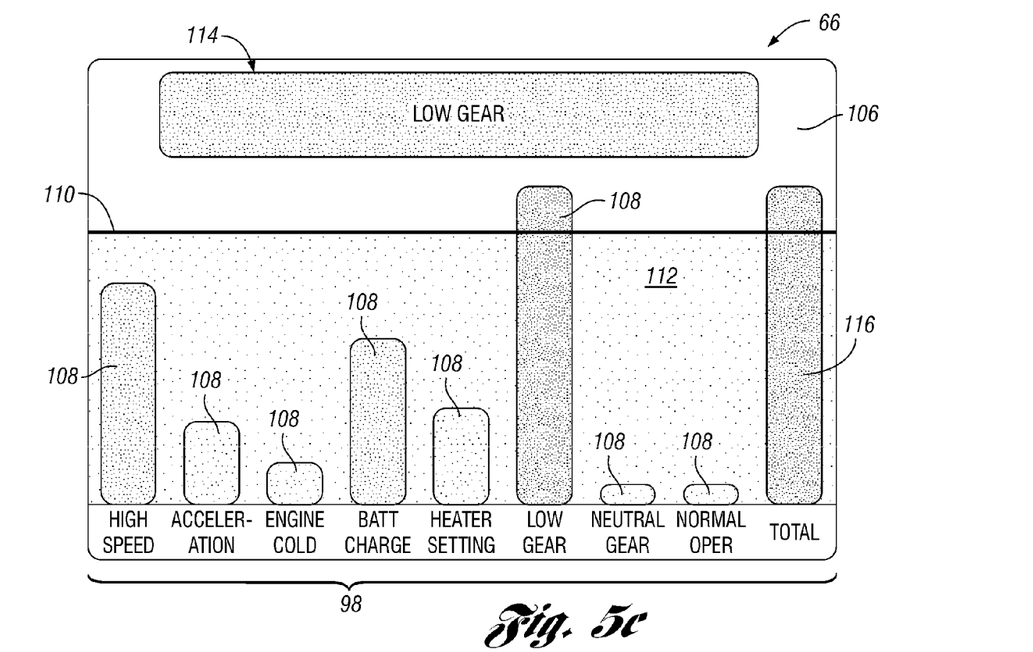
FIG. 5c is a simplified, exemplary diagram depicting a proximity gauge according to one or more embodiments of the present application.

The parameter being monitored for some engine on reasons 98 may be binary such that when a condition is true, the engine 12 is turned on (if not already on), and when a condition is false, the engine 12 is turned off (unless the engine is on for another reason). For example, the HEV operation strategy may be such that any time the vehicle 10 is in low gear, the engine 12 is turned on. Shifting out of low gear may cause the vehicle 10 to return to the EV mode. FIGS. 5a-5c illustrate ways in which binary engine on reasons may be handled according to one or more embodiments of the present application.

FIGS. 5a-5c each demonstrate an exemplary embodiment of the behavior of the information display 66 when a binary engine on reason is in a state that causes the engine 12 to be on. In each example, the engine 12 is on because the vehicle 10 is in the low gear. As shown, no other binary reasons are true and no other non-binary engine on reasons 98 exceed the threshold 110. However, the concepts described below with respect to FIGS. 5a-5c could still apply even if another engine on reason 98 was true or exceeded the threshold 110. In FIG. 5a, the engine on reason 98 or the engine on reason explanation 104 may be displayed in the status region 114. As shown, the total indicator 116 may not cross the threshold 110 when only a binary engine on reason is true. Instead, the total indicator 116 may only be a reflection of the overall relative proximity to an engine mode transition event for non-binary engine on reasons. It is further contemplated that the threshold 110 may disappear entirely when only a binary engine on reason exists.

According to another embodiment, the total indicator 116 may cross the threshold to reflect the binary engine on reason, as shown in FIG. 5b. Again, the engine on reason 98 or the engine on reason explanation 104 may be displayed in the status region 114. According to yet another embodiment, shown in FIG. 5c, a proximity indicator 108 may be associated with each binary engine on reason, similar to the non-binary engine on reasons. The binary proximity indicator may also have two states: one below the threshold 110 and one above the threshold 110. FIG. 5c depicts the "Low Gear" proximity indicator above the threshold 110 to indicate that the engine 12 is on due to vehicle 10 being in low gear. The "Neutral Gear" proximity indicator is a binary indicator shown below the threshold 110.

Figure 6:
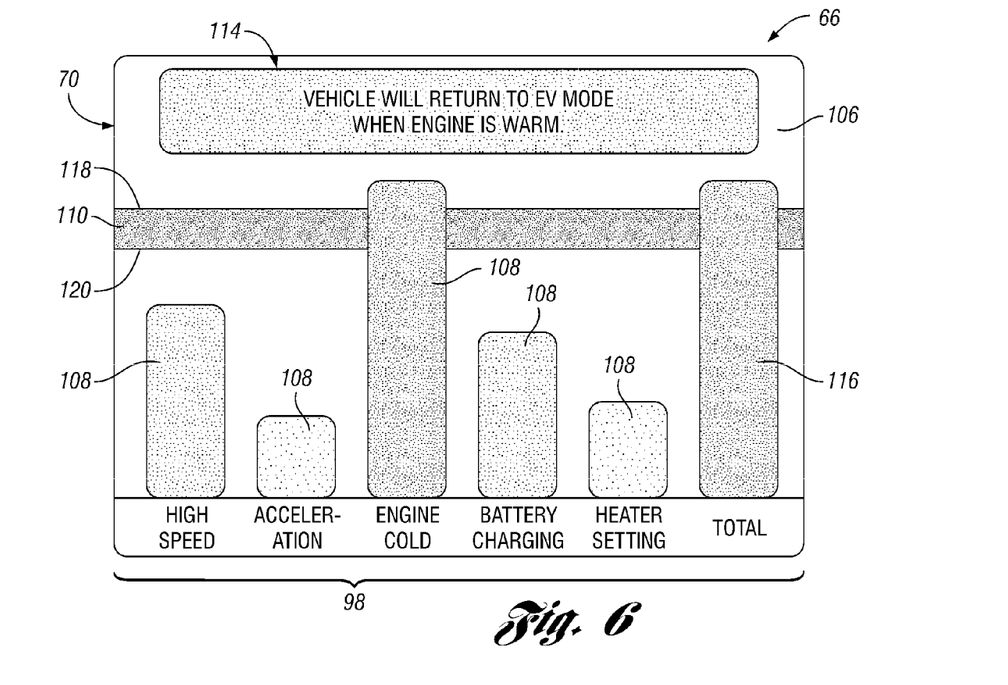
FIG. 6 is a simplified, exemplary diagram depicting a proximity gauge according to one or more embodiments of the present application.

FIG. 6 depicts another exemplary embodiment of a proximity gauge 106 according to one or more embodiments of the present application. The proximity gauge in FIG. 6 is similar to the proximity gauge shown in FIG. 4b, except that the threshold 110 in FIG. 6 may be a wider band. A reason for a wide band threshold is that the value for a parameter that causes the engine 12 to turn on may not be the same value that causes the engine 12 to turn off. The wider threshold band may account visually for any potential engine on/off hysteresis. Thus, an operator may expect the engine 12 to turn on (if off) or turn off (if on) once the proximity indicator 108 ventures into the banded threshold 110.

An alternate way to account for potential engine on/off hysteresis may be to think of the threshold band as including two thresholds—an engine on threshold 118 and an engine off threshold 120. As shown in FIG. 6, the engine on threshold 118 may be located at the top edge of the band and the engine off threshold 120 may be disposed at the bottom edge of the band. To this end, when the vehicle 10 is in the EV mode, the engine 12 may not turn on until a proximity indicator 108 crosses the engine on threshold 118. In contrast, when the engine 12 is on, it may not turn off until the proximity indicator 108 crosses the engine off threshold 120.

Figure 7A:
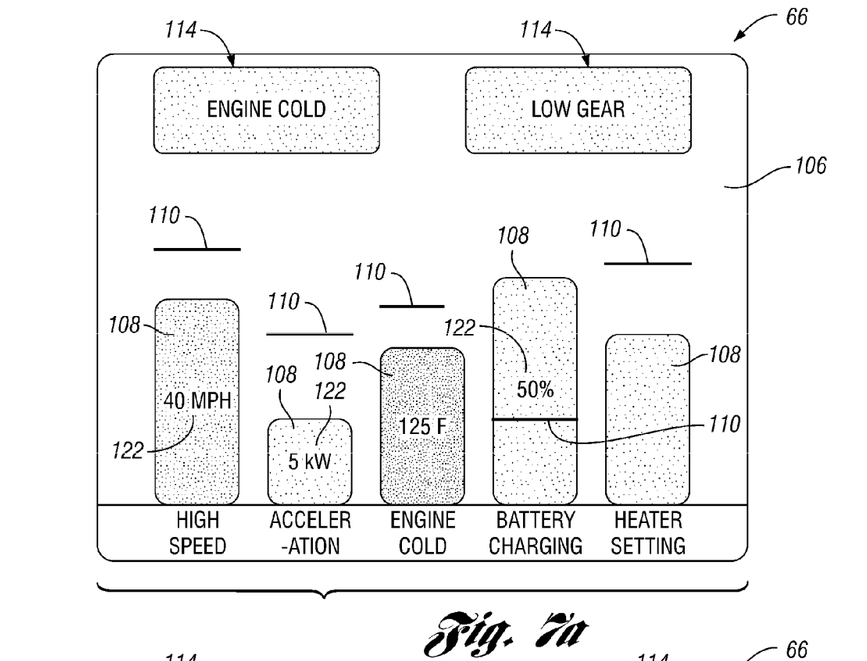
FIG. 7a is a simplified, exemplary diagram depicting a proximity gauge according to one or more embodiments of the present application.
Figure 7B:
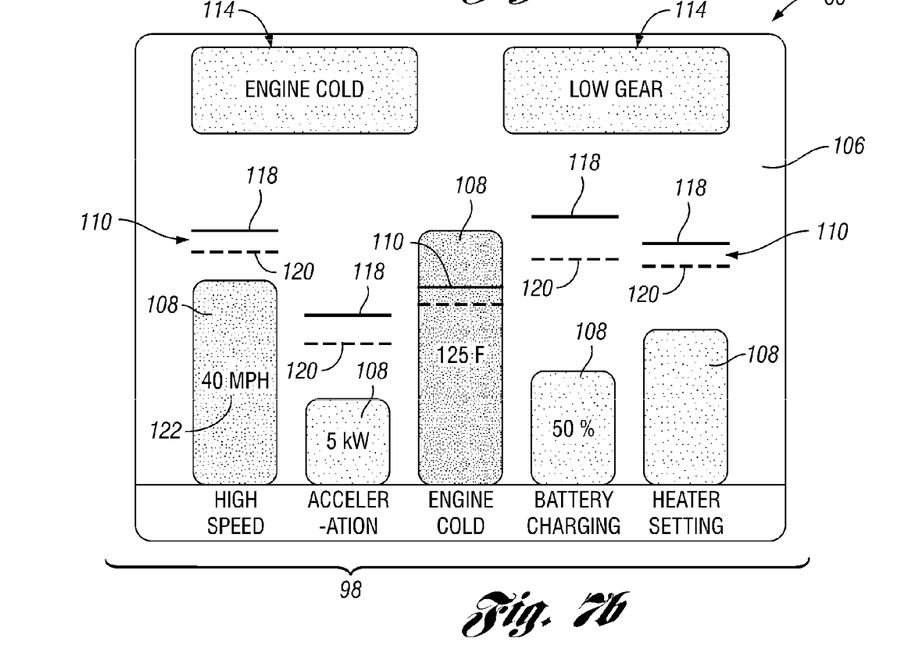
FIG. 7b is a simplified, exemplary diagram depicting a proximity gauge according to one or more embodiments of the present application.

FIGS. 7a and 7b depict additional exemplary embodiments according to one or more aspects of the present application. The proximity gauges illustrated in FIGS. 7a and 7b include independent engine on/off thresholds 110, one for each proximity indicator 108. Thus, the thresholds 110 may actually represent real threshold values, rather than a normalized value. Likewise, each proximity indicator 108 may correspond to a real value for its corresponding engine on/off parameter. Of course, the scaling may differ between different proximity indicators. Further, the real value for each proximity indicator 108 may be displayed as alphanumeric text 122 inside or near the proximity indicator 108. As shown in FIGS. 7a and 7b, the proximity gauge 106 may include more than one status region 114 for displaying engine on reasons 98 similar to that shown in FIG. 2b. When the vehicle 10 is in the EV mode, the status regions 114 may disappear or the EV mode indicator 94 may replace the engine on reason(s) 98.

Unlike other embodiments described herein, the proximity indicators 108 depicted in FIG. 7a corresponding to the "Engine Cold" and the "Battery Charging" engine on reasons are not inverted. That is, as the proximity indicator increases, so too does the value it represents. In this regard, the engine 12 may be on when the proximity indicators corresponding to the "Engine Cold" and the "Battery Charging" engine on reasons are below their respective thresholds 110. Thus, as shown in FIG. 7a, the proximity gauge 106 may convey that the engine 12 is on due to the "Engine Cold" engine on reason. The proximity gauge 106 in FIG. 7a also shows that the engine 12 may be on due to a binary engine on reason, i.e., "Low Gear."

In accordance with one or more embodiments of the present application, the color of each independent threshold may indicate whether the threshold is currently an engine pull-up threshold or an engine pull-down threshold. An engine pull-up threshold may identify a threshold that causes the engine 12 to turn on if reached by a corresponding proximity indicator. An engine pull-down threshold may identify a threshold that causes the engine 12 to turn off if reached by a corresponding proximity indicator. For example, an engine pull-up threshold may be orange and an engine pull-down threshold may be green, although any color combination is contemplated.

As an example, the thresholds 110 depicted in FIG. 7a for the "High Speed," "Acceleration," "Battery Charging" and "Heater Setting" engine on reasons are presently engine pull-up thresholds and may be displayed in orange. If a proximity indicator 108 associated with any of these engine on reasons 98 passes its corresponding threshold, the threshold 110 becomes an engine pull-down threshold and may change colors (e.g., to green). The only current engine pull-down threshold shown in FIG. 7a corresponds to the "Engine Cold" engine on reason and may be displayed in green. Should the "Engine Cold" proximity indicator pass this green threshold, the engine pull-down threshold may change to the color orange to indicate it is now an engine pull-up threshold.

In accordance with one or more embodiments of the present application, the proximity indicators 108 shown in FIGS. 7a and 7b may also change color properties (e.g., hue, saturation, lightness) based upon their proximity to an engine on/off threshold 110. Thus, an operator may be able to determine the current "ON" reasons at a glance, as well as whether other reasons are close or not to becoming "ON" reasons.

FIG. 7b is similar to FIG. 7a, except that the proximity indicators 108 for the "Engine Cold" and "Battery Charging" engine on reasons are inverted as they were in FIG. 4a to FIG. 6. Thus, an increase in the size of these indicators may correspond to a decrease in the corresponding value being monitored. As shown in FIG. 7b, the engine 12 may be on due to a low engine temperature. As is also shown, the engine 12 may be on because it is in a low gear, which relates to a binary engine on reason, as indicted in the status region 114.

Additionally, each proximity indicator 108 in FIG. 7b is shown having two independent thresholds. Similar to FIG. 6, the upper threshold may be the engine on threshold 118 and the lower threshold may be the engine off threshold 120. Like FIG. 6, the two independent thresholds depicted in FIG. 7b may account for potential engine on/off hysteresis. Both thresholds for each proximity indicator 108 may be displayed at the same time. They may be the same or different colors. For example, the engine on threshold 118 may be orange to indicate an engine pull-up and the engine-off threshold 120 may be green to indicate an engine pull-down. Alternatively, only one threshold for each proximity indicator 108 may be displayed at a given time. The engine on threshold 118 may be displayed when a corresponding engine on reason value is not causing the engine 12 to be on. When the proximity indicator 108 reaches the engine on threshold 118, the engine on threshold 118 may disappear while the engine-off threshold 120 is displayed.

While several different proximity gauge embodiments have been described in detail herein, it should be noted that none of the embodiments are independent from one another. Rather, one or more features described with respect to one embodiment may be applied in whole or in part to alternative exemplary embodiments. Every possible combination of display features for the proximity gauge 106 has not been shown for purposes of brevity, but is considered fully supported herein.

Figure 8:
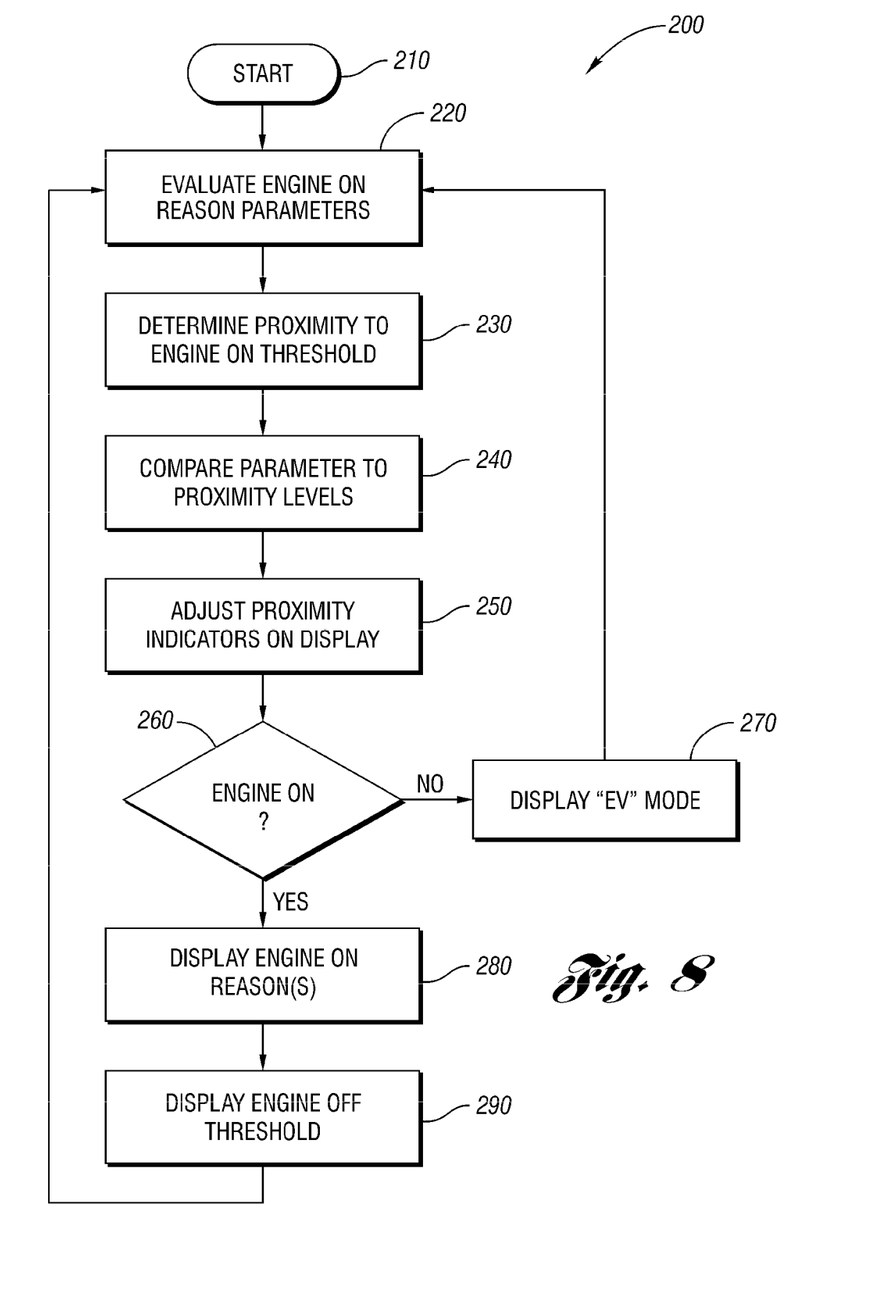
FIG. 8 is a simplified, exemplary flowchart depicting a methodology according to one or more embodiments of the present application.

FIG. 8 depicts a simplified, exemplary method 200 according to one or more embodiments of the present application. Step 210 provides an entry to the method. At step 220, the parameters corresponding to each engine on reason 98 may be evaluated. The parameters may correspond to real time vehicle information. In this regard, a value is obtained for each parameter. For some engine on reasons 98, the value may be a binary value, such as a true or false. In certain embodiments, the value may be normalized to allow each engine on reason 98 to share the same threshold 110 as displayed on the proximity gauge 106. Next, the value obtained for each engine on reason parameter may be compared to the engine on/off threshold 110 for that parameter to determine its relative proximity to the threshold, as provided at step 230. The system may then determine whether the threshold 110 has been reached, and the vehicle 10 may operate accordingly. Additionally, determining proximity of the value to the threshold 110 may determine the color properties to be applied to the proximity indicator 108 for display purposes.

Optionally, the value obtained for each engine on reason parameter may be compared or converted to one or more engine on reason levels, each level covering a range of values, as indicated at step 240. The proximity indicator 108 may move on the display 66 in increments in accordance with the one or more levels. Thus, each level may have a separate threshold. The next proximity level may be attained when the value crosses the next level's threshold. In this regard, the color properties of the proximity indicator 108 may change in correspondence with the current engine on reason level.

As the values are obtained and compared to the various thresholds to determine relative proximity to an engine on/off transition, the proximity gauge 106 may be adjusted accordingly at step 250. To this end, the proximity indicators may increase, decrease or change colors. The engine on/off thresholds may also change colors. The color properties of the threshold region 112 may also vary. At step 260, the system may determine whether vehicle conditions are such that the engine 12 is on due to any of the engine on reasons 98. If the engine 12 is not on and the vehicle 10 is operating in the EV mode, the EV mode indicator 94 may be displayed, as shown by step 270. The method may then return to step 220 to continuously evaluate the engine on parameters in real time. If, on the other hand, it is determined that the engine 12 is on, the one or more engine on reasons 98 responsible for the engine's operation may be displayed, as shown at step 280. For example, the proximity gauge 106 may display an indicator, text, or other iconography corresponding to the engine on reason(s) 98, the engine on reason explanation(s) 104, or both.

In certain embodiments, such as those discussed with respect to FIG. 7b, an engine off threshold 120 may appear as an engine on threshold 118 disappears, as indicated at step 290. In particular, an engine on threshold 118 may be displayed for an engine on reason 98 that is not presently causing the engine 12 to be on. Should the proximity indicator 108 reach the engine on threshold 118, the engine on threshold 118 may disappear. A new threshold, the engine off threshold 120, may then be displayed instead to indicate the proximity to an engine pull-down request. The engine pull-down request would cause the engine 12 to turn off if no other engine on reasons 98 are causing the engine 12 to be on. The two different thresholds in this instance can account for engine on/off hysteresis. The method may then return to step 220 and the cycle repeats to continuously evaluate the engine on parameters in real time and update the information display 66 accordingly.

It should be noted that the method of FIG. 8 as described herein is exemplary only, and that the functions or steps of the methods could be undertaken other than in the order described and/or simultaneously as may be desired, permitted and/or possible.

While the best mode for carrying out the claimed invention has been described in detail, those familiar with the art to which the claimed invention relates will recognize various alternative designs and embodiments for practicing the invention as defined by the following claims.

What is claimed:

1. A vehicle system comprising:
 a display including:
  at least one first threshold associated with a plurality of engine-on reasons, and
  a plurality of indicators, each corresponding to a different engine-on reason; and
 a controller that determines a value associated with each engine-on reason and instructs the display to display each indicator based on its associated value;
 wherein the first threshold indicates the value for each engine-on reason that causes an engine to turn on.

2. The system of claim 1, wherein the plurality of indicators change color based upon their proximity to the first threshold.

3. The system of claim 2, wherein the value corresponds to one of a plurality of proximity levels indicating a relative proximity to the first threshold.

4. The system of claim 1, wherein the display displays at least one of the engine-on reasons when the value corresponding to that engine-on reason reaches the first threshold.

5. The system of claim 4, wherein displaying at least one of the engine-on reasons includes displaying an engine-on reason explanation for the engine-on reason.

6. The system of claim 1, wherein the first threshold changes color when at least one indicator reaches the first threshold.

7. The system of claim 1, further comprising a second threshold indicating the value for each engine-on reason that causes the engine to turn off, the second threshold different from the first threshold.

8. The system of claim 7, wherein the second threshold is displayed when the engine is on for at least the engine-on reason corresponding to the first threshold.

* * * * *